United States Patent [19]

Devitt et al.

[11] Patent Number: 4,556,863

[45] Date of Patent: Dec. 3, 1985

[54] EMERGENCY LIGHT SWITCH

[75] Inventors: Charles J. Devitt, Glen Cove; LeRoy M. Freeman, Westbury, both of N.Y.; Saul I. Slater, Miami Beach, Fla.

[73] Assignee: Slater Electric Inc., Glen Cove, N.Y.

[21] Appl. No.: 446,917

[22] Filed: Dec. 6, 1982

[51] Int. Cl.[4] .......................... B60Q 1/46; G08B 5/00
[52] U.S. Cl. ................................. 340/81 R; 340/332; 340/331; 200/310
[58] Field of Search ............................. 340/330-332, 340/81 R, 84, 81 F; 315/136, 200 A; 200/310-312, 68.1, 315, 339

[56] References Cited

U.S. PATENT DOCUMENTS

| 772,908 | 10/1904 | Ridderhof et al. | |
| 2,695,403 | 11/1954 | Stoker et al. | 340/321 |
| 2,911,637 | 11/1959 | Wortmann | 340/321 |
| 2,983,812 | 5/1961 | Ashe | 240/10.66 |
| 3,047,773 | 7/1962 | Morton | 315/205 |
| 3,058,032 | 10/1962 | Woodward | 315/72 |
| 3,301,988 | 1/1967 | Weitzman | 200/315 |
| 3,360,791 | 12/1967 | Lazer | 340/330 |
| 3,631,318 | 12/1971 | Hubbard | 315/209 |
| 3,728,713 | 4/1973 | Alten | 315/200 A |
| 4,003,040 | 1/1977 | Browand | 340/332 |
| 4,038,582 | 7/1977 | Horwinski | 315/129 |
| 4,081,632 | 3/1978 | Schaffler | 200/68.1 |
| 4,114,071 | 9/1978 | Thrower, Jr. et al. | 315/226 |
| 4,177,408 | 12/1979 | Mason | 200/6 R |
| 4,276,542 | 6/1981 | Russ | 340/331 |

FOREIGN PATENT DOCUMENTS 0697184  11/1964  Canada .............................. 200/68.1

Primary Examiner—John W. Caldwell, Sr.
Assistant Examiner—Tyrone Queen
Attorney, Agent, or Firm—Morgan, Finnegan, Pine, Foley & Lee

[57] ABSTRACT

A switch apparatus designed to replace a conventional on/off switch for the purpose of allowing an outside light to be flashed continuously on and off, as well as permitting the light to be turned on and off in the conventional manner is disclosed. The switch apparatus may be directly substituted for a conventional on/off switch using the two wires already in the switch box. The switch apparatus incorporates either a standard or an asymmetrical mechanical switching mechanism for turning the light on or off conventionally, and for selecting the flashing mode. When the flashing mode is selected, an electronic circuit continuously switches the flow of power to the light bulb on and off via a power switcher controlled by an oscillator. Inserted within an actuator handle of the switching mechanism is a neon light which is on when the switch apparatus is in the off position and off when the apparatus is in the on position. During the flashing mode this same light flashes in a duty cycle opposite to the duty cycle of the flashing porch light.

11 Claims, 7 Drawing Figures

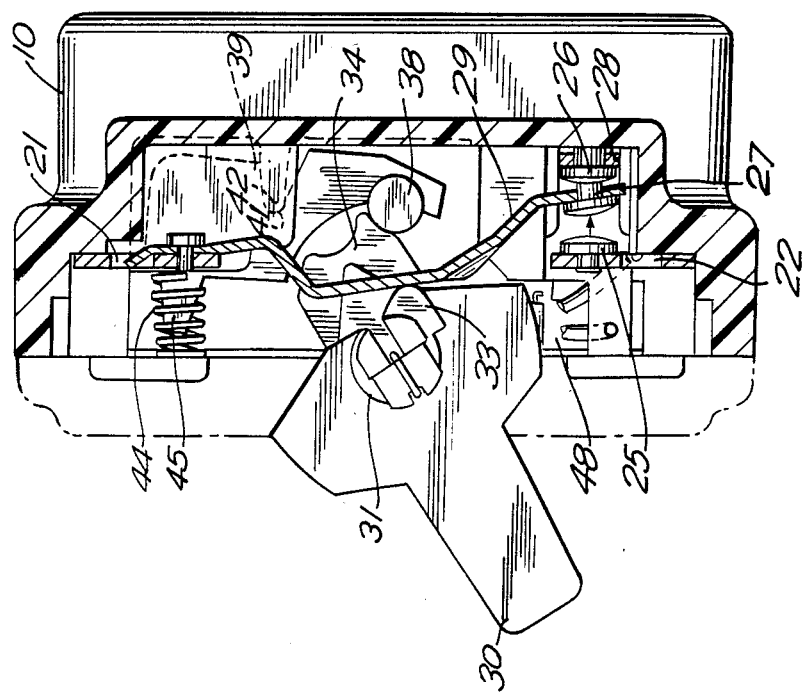
FIG. 4
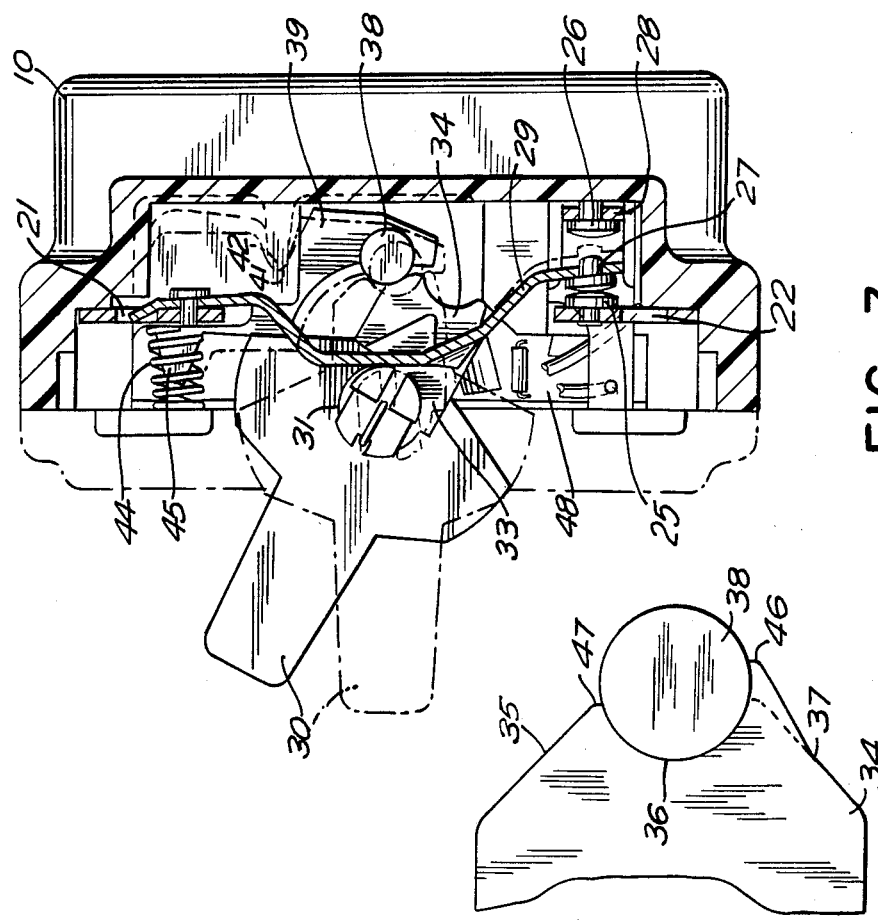
FIG. 3
FIG. 5

EMERGENCY LIGHT SWITCH

BACKGROUND OF THE INVENTION

This invention relates to switch apparatuses and more particularly to a switch apparatus that can flash a light on and off continuously, as well as turn the light on and off conventionally, yet be installed using the existing wiring system of a house or other building.

It is extremely valuable to have a light such as a porch light or other outdoor light that can be flashed on and off repeatedly so as to attract attention to one's house for one reason or another, particularly when the house is located in a neighborhood in which numerous porch lights are normally turned on. A flashing porch light can be used for various reasons. For example, it can be used to indicate to neighbors that there is a danger situation within your house, such as when you are very sick. It can also be used for guiding a fire engine, ambulance or police car to your house in an emergency, or for just helping friends find your house when you are having a party.

Light flashing apparatuses are known in the prior art. Typically, however, these apparatuses are not usable in a standard light switch outlet box because of size limitations and/or because such apparatuses are not capable of turning a light on and off in the conventional manner. Nevertheless, there have been attempts to provide a switch apparatus that can flash a light on and off continuously, as well as turn the light on and off in the conventional manner, yet be installed in a standard light switch outlet box. However, such apparatuses have either required expensive modifications to existing wiring, or were unsafe to use.

One switch apparatus designed for use with existing wiring is described in U.S. Pat. No. 4,177,408. It utilizes a replaceable flasher wafer or disc within its housing to flash a porch light on and off. The frequency at which the light is flashed is a function of the wattage of the bulb being used because this determines the amount of power flowing through the light and disc, and thus, the rate of heating of the disc. But a flasher disc can be dangerous to use, as is demonstrated by the failure of Underwriters Laboratories to approve its safety. In addition, such discs are also unreliable in operation. Usually, they require frequent replacement since they tend to be short lived. As such, there is a strong possibility that a disc will fail to operate when it is most needed, i.e., during an emergency.

Thus, there is a need for a safe and reliable switch apparatus that can be installed without additional wires, and that can turn an outside light on and off in the conventional manner, yet also flash the light on and off continuously when necessary.

SUMMARY OF THE INVENTION

A primary object of the present invention is to provide a switch apparatus that can safely and reliably flash a light on and off, yet also be installed using the existing wiring system of a house or other building.

Another object of the present invention is to provide a switch apparatus that can safely and reliably flash a light on and off, yet also permit the light to be turned on and off in the conventional manner.

The present invention is a new and improved switch apparatus designed to replace a conventional on/off switch for the purpose of allowing a light such as a porch light to be flashed continuously on and off, as well as permitting the light to be turned on and off in the conventional manner. The switch apparatus may be directly substituted for a conventional on/off switch since the two wires in the switch box, which are normally connected to the conventional switch, may instead be connected to the flash producing switch apparatus in the conventional manner without additional wires.

The switch apparatus incorporates either a standard or an asymmetrical mechanical switching mechanism for turning the light on or off conventionally, as well as, for selecting the flashing mode. In the preferred embodiment the asymmetrical switching mechanism is used. When the actuator handle of this mechanism is pushed to the up position, the light is turned on continuously. To turn the light off, the actuator handle is moved to a middle position. Pushing the actuator handle all the way down places the switch apparatus in the flashing mode. Since the preferred switching mechanism is asymmetrical in design, an additional effort is necessary to move the actuator handle to the down position. This arrangement prevents a user from inadvertently selecting the flashing mode.

When the flashing mode is selected, a novel electronic circuit is switched into the porch light circuit. This circuit controls the flow of power to the light bulb to produce the flashing, switching it on and off via a power switcher. The power switcher, in turn, is controlled by an oscillator having a factory preset frequency that is independent of load size. Thus, the frequency at which the light is flashed is independent of the light's size, allowing the switch apparatus to be used with different wattage bulbs without variation in flash rate. An AC to DC power supply provides the necessary power for the circuit components.

The actuator handle of the switching mechanism is translucent. Inserted within the actuator handle is a neon light which is on when the switch apparatus is in the off position and off when the switch is in the on position. During the flashing mode this same light flashes in a duty cycle opposite to the duty cycle of the flashing porch light. The neon light can also be used to determine whether or not the porch light is functioning. If the porch light is loose or burned out the neon bulb will not light in any switch position.

DESCRIPTION OF THE DRAWINGS

FIG. 3 is a cross-sectional view of the switch apparatus taken along line 3—3 of FIG. 2 showing the asymmetrical switching mechanism in the on and off positions.

FIG. 4 is another cross-sectional view of the switch apparatus taken along line 3—3 of FIG. 2 showing the asymmetrical switching mechanism in the flashing mode.

FIG. 5 is a simplified, enlarged side elevational view of the detenting cam of the asymmetrical switching mechanism.

DESCRIPTION OF THE PREFERRED EMBODIMENT

The switch apparatus of the present invention is capable of being installed using the existing wiring system of a house or other building. It is to be understood that it is contemplated that the switch apparatus is to be installed in a standard switch box mounted in a building wall and that it is to be connected to the porch light and a source of power by a standard two wire cable. When the switch apparatus is inserted into the switch box it is connected to the two wires already in the box normally used to turn the porch light on and off.

Figure 1:
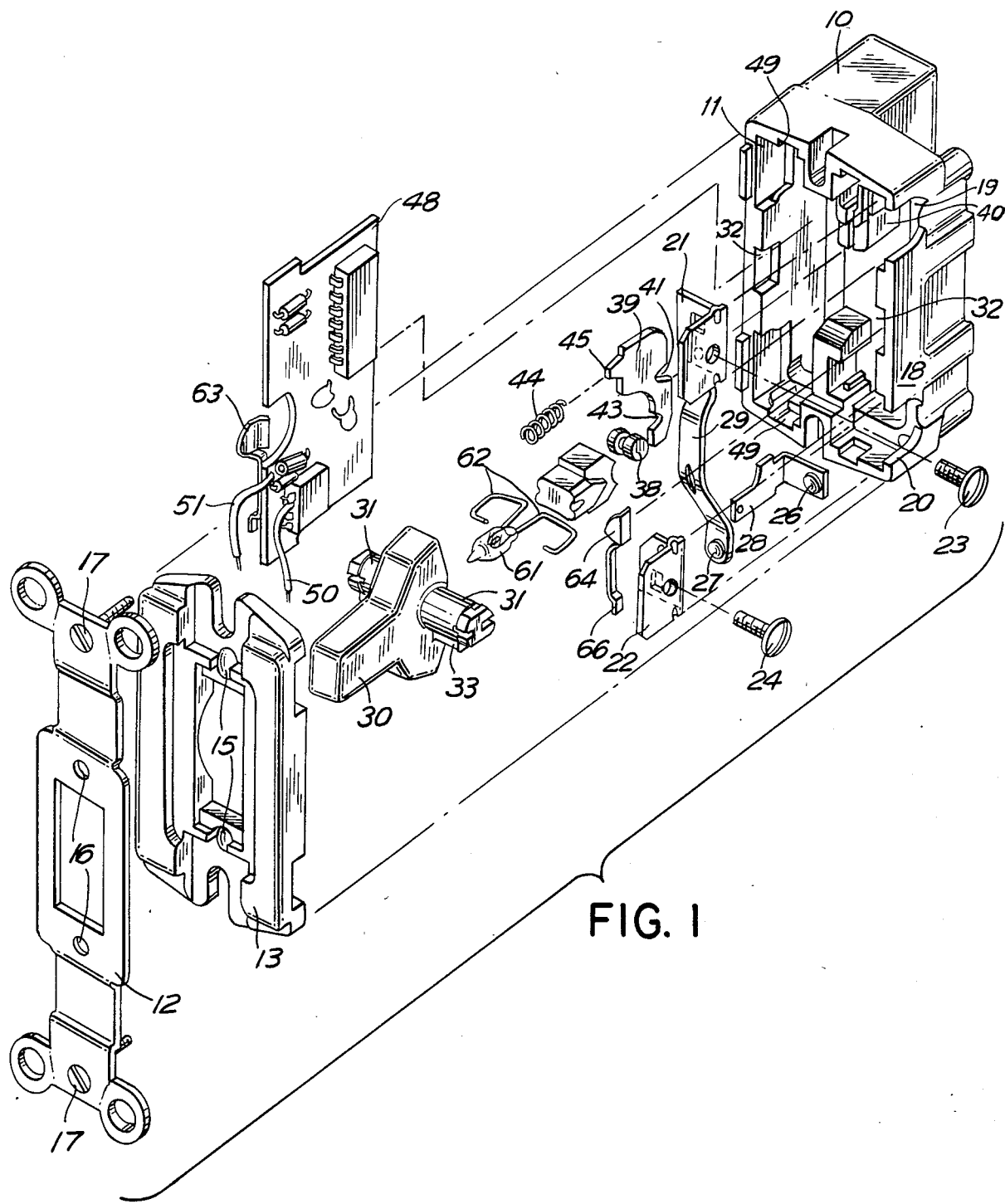
FIG. 1 is an exploded view of the switch apparatus in perspective.

FIG. 1 is an exploded view showing the components comprising the switch apparatus. The apparatus has a plastic housing or body 10 having an open front 11 over which a metal strap 12 and plastic cover 13 lie. Both strap 12 and cover 13 are secured to body 10 by rivets (not shown) passing through holes 14 (best seen in FIG. 2) in the end walls of the body and through holes 15 and 16 of cover 13 and strap 12 respectively. Screws 17 also passing through the strap are then used to hold the switch apparatus within the switch box.

Figure 2:
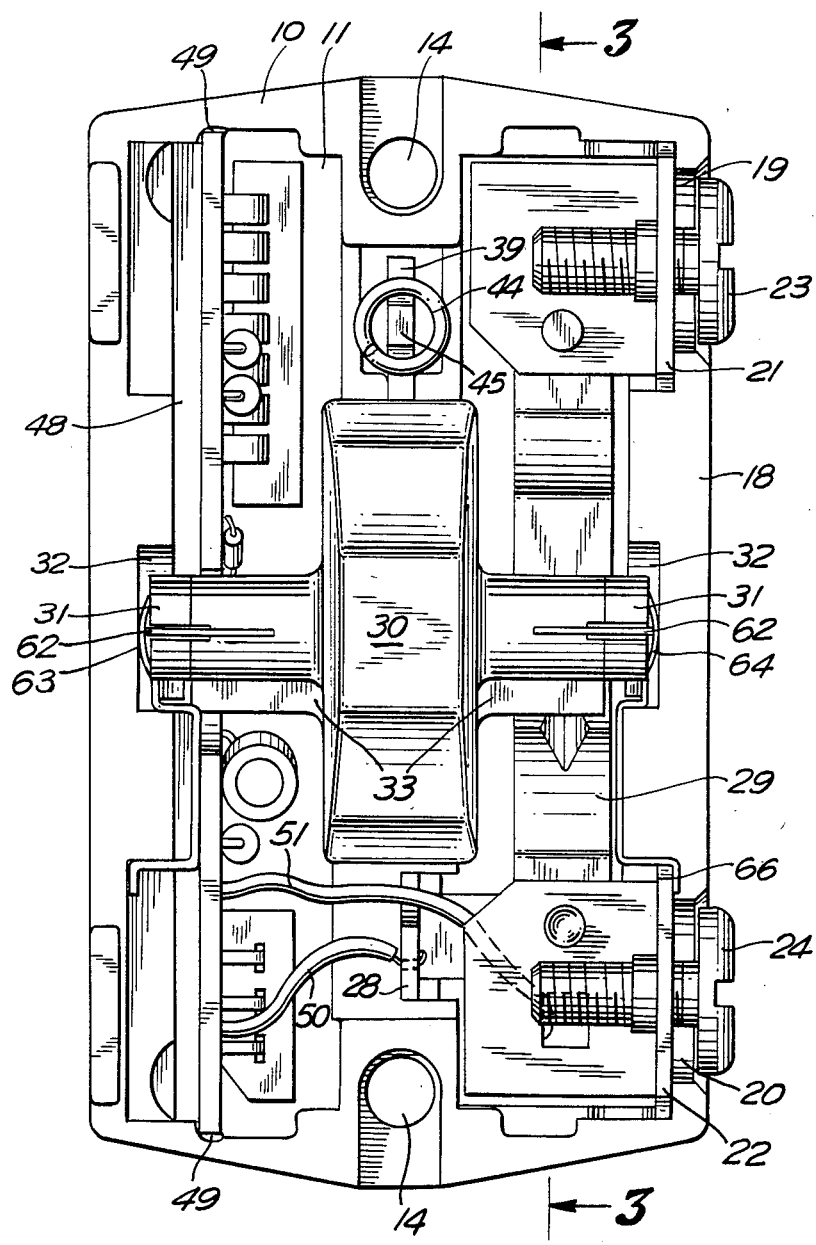
FIG. 2 is a plan view of the switch apparatus with its cover removed.

FIG. 2 is a plan view of the switch apparatus in its assembled state with its strap and cover removed. One side-wall 18 of the apparatus' body has a pair of wide slots 19 and 20 therein at opposite ends for receiving the brass terminal plates 21 and 22, respectively, to which the wires of the two wire cable (not shown) are connected. Terminal screws 23 and 24 are then threaded into terminal plates 21 and 22, respectively, to hold the wires to the plates. Both plates are bent in a substantially L-shaped configuration, and are held against the bottom of their respective slots by pressure exerted by cover 13 when it is secured to body 10.

The actual switching function can be implemented through either a standard multi-position mechanical switching mechanism, or one that is asymmetrical in design. Operation of the preferred asymmetrical switching mechanism is shown in FIGS. 3 and 4. It incorporates a double throw (open center) switching mechanism having a pair of stationary contacts 25 and 26 and a moveable contact 27. One stationary contact 25 is riveted to terminal plate 22, while the other stationary contact 26 is riveted to an L-shaped terminal 28 resting in a cavity molded into the back wall of body 10. This L-shaped terminal or L-terminal is in turn wired to the flashing circuit. Moveable contact 27 is riveted to one end of a vertically disposed flexible member 29 so as to be positioned between contacts 25 and 26. Flexible member or moveable 29 has a substantially flat U-shape and is riveted on the end opposite contact 27 to upper terminal plate 21.

Movement of contact 27 between the two stationary contacts is accomplished by the flexing of moveable 29 by an actuator arm 30. Depending upon the position of the actuator arm the porch light will either be continuously on, off or flashing on and off.

Two cylindrical projections or trunnions 31, one on each side, support actuator arm 30 on body 10 by resting in narrow slots 32 molded into the side walls thereof. Each of these trunnions has a V-shaped protrusion or cam 33 molded as a part thereof. Depending upon the position of actuator arm 30, cam 33 is caused to either not engage, or engage either partially or completely, moveable 29 so as to cause its flexure.

Movement of actuator arm 30 is regulated by a detenting mechanism that utilizes an asymmetrical cam 34 inserted into one end of actuator arm 30. Three non-continuous surfaces 35, 36 and 37 of this cam engage a cam roller 38 to achieve the detenting function. Roller 38 is rotatably supported by a substantially L-shaped support arm 39 pivoted on a carriage 40, also molded into the back wall of body 10. For this purpose arm 39 is provided with a notch 41 cut therein that pivotally engages an edge 42 of carriage 40. Substantially opposite this notch is a second notch 43, best seen in FIG. 1, that rotatably supports cam roller 38. Roller 38 is then caused to exert pressure against the surfaces of cam 34 by reason of support arm 39 being spring loaded by means of a coil spring 44 inserted between a protrusion 45 thereof and an indentation (not shown) molded into the back of cover 13.

Thus, to turn the porch light continuously on, actuator arm 30 is shifted upward to the "ON" position (FIG. 3). Once arm 30 is moved to this position it is held in place by cam roller 38 bearing on surface 35 of insert cam 34. Movement of the actuator arm to this position causes trunnion cam 33 to be shifted downward, thereby causing it to disengage from moveable 29. This in turn allows the moveable to shift forward so that moveable contact 27 engages contact 25, thereby completing the circuit to the light for continuous illumination.

To turn the light off, the actuator arm is shifted partially downward to a horizontal or middle "OFF" position (FIG. 3). It is held in this horizontal position by cam roller 38 bearing against U-shaped surface 36 of cam insert 34. In this position the trunnion cam 33 is caused to partially engage the moveable so as to cause a partial flexure thereof, such that moveable contact 27 is shifted backward to a neutral position between the two stationary contacts. In this position the light circuit is opened, thereby preventing the flow of power to the porch light.

To flash the light on and off, the actuator arm is shifted completely downward (FIG. 4) where it is held in position by the cam roller bearing against surface 37. Since this lower position coincides with the off position of a conventional light switch, provision is made to prevent a user from accidentally moving the actuator to this position. For this purpose, cam insert 34 is asymmetrical in design, requiring a user to exert additional force to move the actuator arm completely downward. As can be seen in FIG. 5, surfaces 35 and 37 are asymmetrical with respect to surface 36. As a consequence, more force is required to move cam roller 38 from surface 36 over pinnacle 46 to surface 37, than is necessary to move roller 38 from surface 36 over pinnacle 47 to surface 35. In the preferred embodiment shown in FIG. 5, additional material is added to side 37 of cam 34 to make it asymmetrical, however, it is to be understood that alternative designs accomplishing the same result may also be used.

Once the actuator arm has been moved completely downward, it is held in position by the cam roller bearing on surface 37. In this position trunnion cam 33 is rotated to a horizontal position, causing it to fully engage moveable 29. This, in turn, causes additional flexure thereof so that the rear surface of moveable contact 27 engages contact 26, which, in turn, is wired through L-terminal 28 to the flasher circuit shown generally in FIG. 6.

Figure 6:
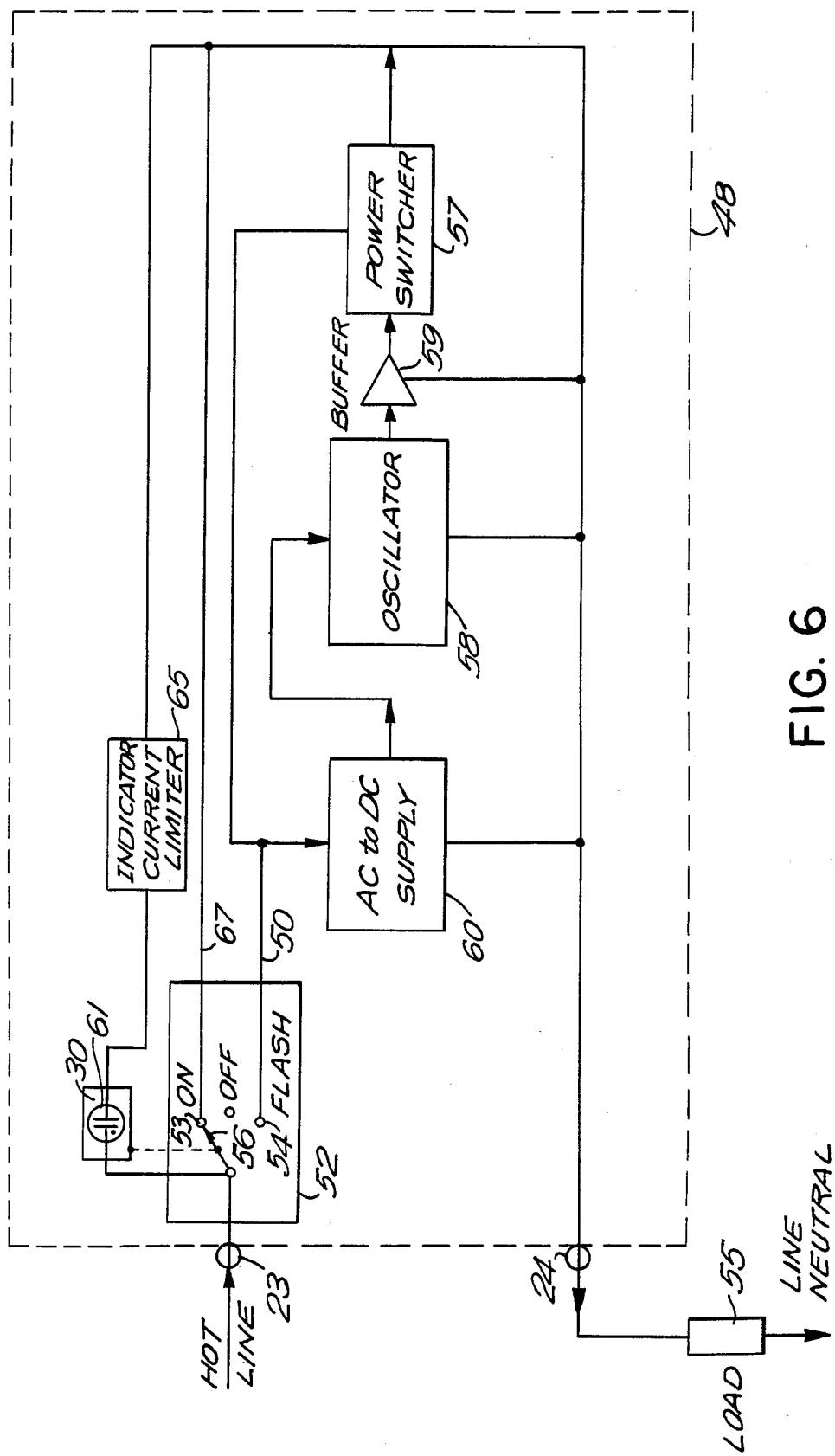
FIG. 6 is a general block diagram of the electronic flashing circuit.

FIG. 6 is a block diagram of the flasher circuit showing its sub-circuits in general terms. The flasher circuit is mounted on a printed circuit board 48 that slides into a cavity on the side of body 10 that is opposite the switching mechanism (best seen in FIGS. 1 and 2). Molded into the top and bottom walls of body 10 is a pair of track like slots 49, one on each end, that accommodate the end edges of circuit board 48. Extending from this board are a pair of wires 50 and 51, one of which is connected to the L-shape terminal to introduce power to the circuit board, the other of which is soldered to terminal plate 22 to complete the circuit.

A standard mechanical switching mechanism, shown as block diagram 52, is used to select the various operating modes of the switch apparatus. Mechanism 52 has two stationary contacts 53 and 54, connected directly to a load 55 and to flasher circuit 48, respectively, and a single moveable contact 56, disposed therebetween and connected to the hot line of the power mains. When the flashing mode is selected, the flow of power to the light bulb, shown as load 55 in FIG. 6, is controlled by the flasher circuit. For this purpose, a power switcher 57 is enabled and disabled periodically by an oscillator 58 via buffer circuitry 59 connected between the oscillator and the power switcher. Power for the electronic components is provided by an AC to DC power supply 60 which receives power when contact 54 is connected to the hot line of the power mains through contact 55.

The time duration for the enable and disable periods of switcher 57 are both long compared to the power mains frequency. During the interval when the power switcher is enabled, line power and frequency are passed through the power switcher to the load 55. When the power switcher is disabled, no power gets to the load and thus the bulb is out. The duty cycle of the load which is equal to the ratio of the time interval the load is on to the sum of the intervals during which the load is on and off, is preferably between 10 and 20 per cent.

Switching mechanism 52, like the preferred asymmetrical switching mechanism, is controlled by an actuator handle such as actuator arm 30, shown as a block diagram mechanically coupled to mechanism 52. As shown in FIG. 1, an illuminating device 61, such as a neon bulb, LED or the like, is inserted within actuator arm 30. Bulb 61 allows actuator arm or handle 30 to be located in a dark room since it is illuminated when the load light is off. The handle is translucent to allow the light generated by the bulb to be seen. Two leads 62 extending from the bulb are used to connect it to a power source. For this purpose, two terminal flags 63 and 64, positioned in slots 32 so as to flank trunnions 31 and touch leads 62, are provided. A current limiter 65 protects it from experiencing excessive current. Terminal flag 63 is physically attached to circuit board 48 and is connected to a power source through board 48's wiring. Terminal flag 64, attached to terminal plate 22 by means of a tail 66 held in slot 20 by plate 22, completes the circuit.

When the switch mechanism is in the "ON" position bulb 61 is off since wire connection 67 between contact 53 and load 55 represents a short circuit to the flow of current, thereby allowing it to bypass bulb 61 and flow directly to the load. When the switch apparatus is in the flashing mode, bulb 61 flashes in opposite duty cycle to load light 55, i.e., when this light is on, the neon bulb is off and vice versa, because power switcher 57 represents a low impedance to the flow of current when it is on, thereby bypassing bulb 61 and conducting power to load light 55.

Figure 7:
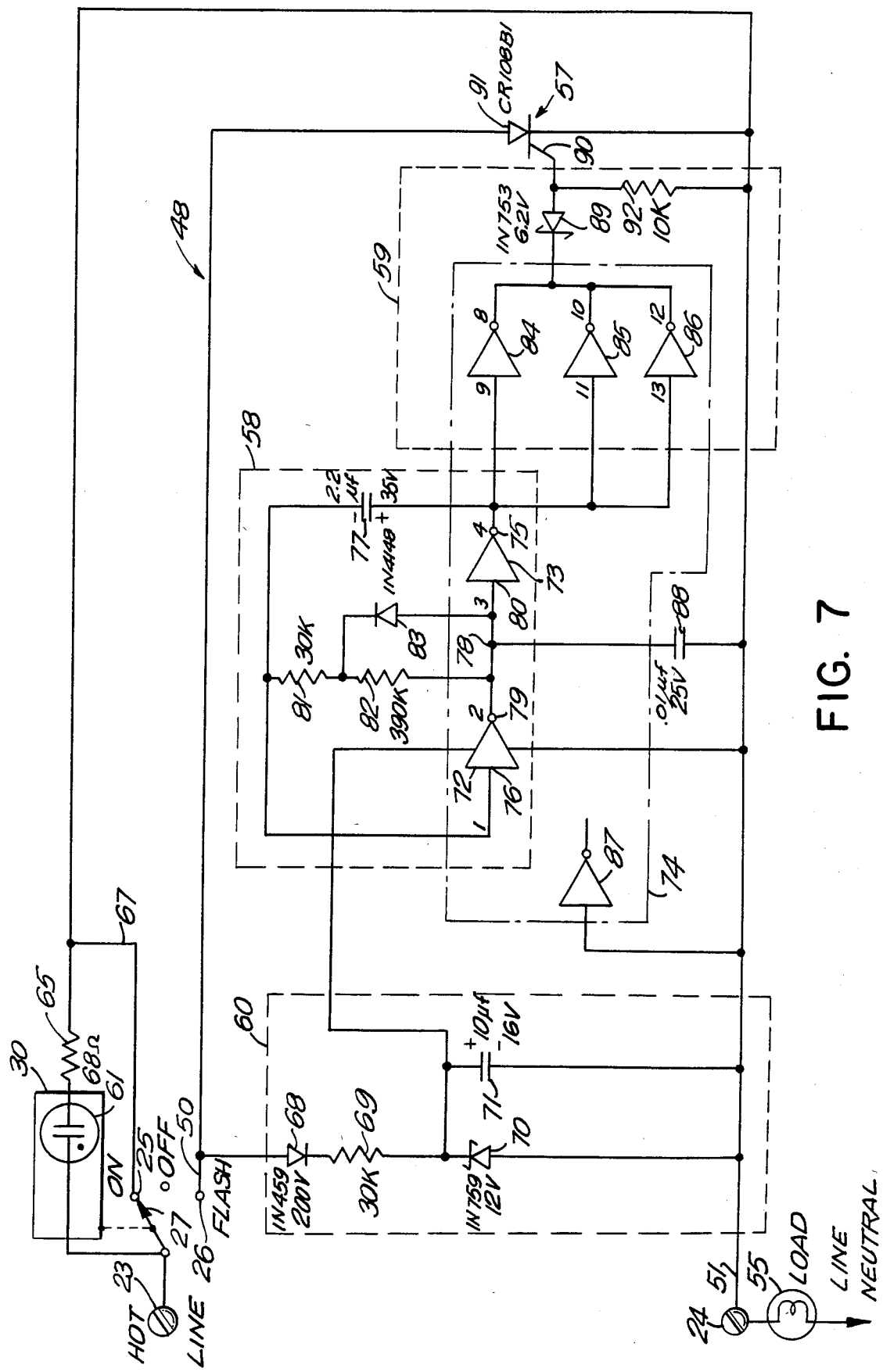
FIG. 7 is a schematic of one circuit design for implementing the block diagram shown in FIG. 6.

FIG. 7 is a schematic diagram of one circuit design used to implement the flasher circuit of FIG. 6. The preferred asymmetrical switching mechanism shown in FIGS. 3 and 4 is used to select the various operating modes. The D.C. supply consists of a diode 68 attached on its anode side to the A.C. line voltage; a resistor 69 connected in series to diode 68 on its cathode side; a zener diode 70 connected on its cathode side to the remaining side of resistor 69 and on its annode side to circuit ground; and a capacitor 71 connected in parallel with diode 70. Diode 68 converts the A.C. line voltage to half wave D.C. Resistor 69 then drops this voltage from line amplitude to the voltage level set by zener diode 70. The zener diode acts as a voltage regulator and filter, maintaining the voltage for the circuitry at a fairly constant level despite line voltage variations. Capacitor 71 then filters the rectified line voltage and attempts to hold the D.C. supply level when the voltage across the supply is interrupted by power switcher 57. The D.C. power supply is developed or charged up only during the intervals when the power switcher is not conducting because the switcher acts as a short circuit in parallel with the supply during the period it is conducting, causing the current from the power mains to bypass the supply. During this time, or when the line voltage is negative with respect to the anode of diode 68, capacitor 71 discharges only to the extent current is flowing through the oscillator and buffer circuits. Diode 68 prevents capacitor 71 from discharging through resistor 69.

The oscillator 58 of FIG. 6 is implemented in the circuit configuration FIG. 7 by means of an Asymmetrical Astable oscillator. This oscillator utilizes two inverter sections 72 and 73, of an integrated circuit hex inverter 74, wired in series. In the preferred embodiment this hex inverter is a low power consumption CMOS device number CD 4069 or equivalent. Connected between the output 75 of inverter 73 and the input 76 of inverter 72 is a capacitor 77 which forms a positive feedback connection. Between the negative side of this capacitor and the connection 78 between the output 79 of inverter 72 and the input 80 of inverter 73 are two resistors 81 and 82 connected in series. In parallel with resistor 82 is a diode 83 having its anode attached to connection 78, and its cathode attached between resistors 81 and 82.

During the operation of the asymmetrical oscillator capacitor 77 is either charging through diode 83 and resistor 81 (when the output 79 of inverter 72 is high) or discharging through resistor 81 in series with resistor 82 (when the output of inverter 72 is low). When the voltage of the input 76 of inverter 72 passes through its transfer voltage level, its output 79 switches state and causes inverter 73's output to switch state also. Thereafter, capacitor 77 starts moving in the opposite direction until the transfer or switching threshold level of inverter 72 is again crossed so that both inverters switch state again.

The output of inverter 73 is tied to the inputs of three sections 84, 85 and 86 of I.C. 74 connected in parallel which are used by buffer 59 to provide additional current drive to the power switcher. A last section 87 of I.C. 74 is not required and is not used; however, its input is tied to I.C. ground to decrease line noise sensitivity. Another capacitor 88 connected between connection 78 and circuit ground provides additional noise suppression so that spikes on the power line will not cause preliminary switching at the inverters.

Buffer 59 also utilizes a zener diode 89 to level shift the output of inverters 84 to 86 down to the input level required for the power switcher. The cathode of this diode is connected to the output of inverters 84 to 86, while its anode is connected to the input gate 90 of the power SCR 91 used to implement power switcher 57. A resistor 92 acts as a D.C. return to circuit ground for the junction between the anode of the zener diode and the input gate of the SCR. This resistor also provides a measure of line noise desensitization.

The time interval for which SCR 91 is enabled is proportional to the product of the value of capacitor 77 and the value of resistor 81, while the time interval during which SCR 91 is disabled is proportional to the product of the value of capacitor 77 and the sum of the values of resistors 81 and 82. The total cycle time over which the SCR is enabled and disabled is preferably between a quarter of a second and one second. It is to be understood, however, that the enabling and disabling intervals can be changed over a wide time range by varying capacitor 77 and resistors 81 and 82 accordingly. In practice, this is normally done at the factory. Nevertheless, it is preferable that the enable period be between 10 and 20 per cent of the total cycle time to avoid problems with circuit heating and to prolong the life of the electronic components.

The above-described embodiment of the invention is illustrative, and modifications thereof may occur to those skilled in the art. The invention is not limited to the embodiment disclosed therein, but is to be limited only as defined by the appended claims.

What is claimed is:

1. A switch apparatus for emergency signaling utilizing an existing two-wire circuit running between a switch box and a load comprising:
    (a) a body mounted within the switch box having a cavity and a cover over said cavity,
    (b) an electronic circuit mounted within said cavity and connected in series with the load, said electronic circuit, when activated, switching power flow to the load on and of continuously at a predetermined frequency and a predetermined duty cycle independently of load size so that dangerous heating of said electronic circuit is avoided, and
    (c) a switching mechanism mounted within said cavity comprised of:
        (1) conducting means positionable either between an alternating power source and the load so that the load is on continuously, at a neutral position so that the load is off continuously, or between said alternating power source and said electronic circuit so that the load is switched on and off continuously at said predetermined frequency and said predetermined duty cycle,
        (2) an actuator mounted on said body engaging said conducting means for controlling positioning of said conducting means, and
        (3) a detenting mechanism for regulating positioning of said actuator, said detenting mechanism being comprised of an asymmetrical cam forming one end of said actuator and a cam follower rotatably mounted within said cavity and bearing against said asymmetrical cam, said asymmetrical cam requiring additional force to be exerted to position said conducting means between said alternating power source and said electronic circuit.

2. A switch apparatus as recited in claim 1 wherein said actuator is rotatably mounted on said body, and wherein said actuator must be moved to a middle position to position said conducting means at said neutral position and thereby turn said load off continously, and completely downward to position said conducting means between said alternating power source and said electronic circuit to switch said electronic circuit in series with said load so that said load is switched on and off continuously.

3. A switch apparatus as recited in claim 2 wherein said asymmetrical cam forming one end of said actuator has two surfaces that are asymmetrical with respect to a third center surface thereof, and wherein said cam follower bears against one of said cam surfaces at a time.

4. A switch apparatus as recited in claim 1 wherein said electronic circuit is comprised of an oscillator, a power switcher switched on and off by said oscillator for switching the flow of power to said load on and off continuously, and an AC to DC power supply energizing said oscillator, said power supply being connected only to a hot wire of the existing two-wire circuit.

5. A switch apparatus as recited in claim 4 wherein said oscillator causes said power switcher, and thereby said load, to switch on and off at a frequency between one and four cycles per second, and have a duty cycle between ten and twenty percent.

6. A switch apparatus as recited in claim 5 wherein said actuator is translucent, and wherein said switch apparatus further comprises an illuminating device mounted within said translucent actuator, said illuminating device being connected across said electronic circuit so that it flashes in opposite duty cycle to the duty cycle of said load.

7. A switch apparatus for emergency signaling connected to a hot wire of an existing two-wire circuit running between a switch box and a light comprising:
    (a) a body mounted within the switch box having a cavity, a cover over said cavity, and a single pair of terminals on its exterior,
    (b) an electronic circuit mounted within said cavity comprised of:
        (1) a power switcher connected in series with the light for switching power flow to the light on and off,
        (2) an oscillator driving said power switcher to turn said power switcher on and off, and
        (3) an AC to DC power supply connected across said oscillator for energizing said oscillator, said power supply input being connected only to the hot wire of the existing two-wire circuit,
    (c) said electronic circuit, when activated, flashing the light on and off continuously at a predetermined frequency and a predetermined duty cycle independently of the light's wattage so that dangerous heating of said electronic circuit is avoided, and
    (d) a switching mechanism mounted within said cavity comprised of:
        (1) a plurality of contacts comprised of a first contact coupled to the light, a second contact connected to said electronic circuit, and a third, movable contact coupled to an alternating power source,
        (2) an actuator rotatably mounted on said body engaging said third, movable contact to control said third, movable contact's position, the light being continuously on when said third, movable contact engages said first contact, continuously off when said third, movable contact is in a neutral position, and flashing continuously on and off when said third, movable contact engages said second contact, and (3) a detenting mechanism for regulating positioning of said actuator comprised of an asymmetrical cam forming one end of said actuator, and a cam follower rotatably mounted within said cavity and bearing against said asymmetrical cam, said asymmetrical cam requiring additional force to be exerted on said actuator to cause said third, movable contact to engage said second contact so that the light flashes on and off continuously.

8. A switch apparatus as recited in claim 7 wherein said electronic circuit, when activated, flashes the light on and off continuously at a frequency between one and four cycles per second and a duty cycle between ten and twenty percent so that said dangerous heating of said electronic circuit is avoided.

9. A switch apparatus as recited in claims 7 or 8 wherein said actuator is further comprised of a second cam engaging said third, movable contact, and wherein said second cam, causes said third, movable contact to engage said first contact when said actuator is shifted up to thereby turn the light continuously on, causes said third, movable contact to sit in a neutral position when said actuator is horizontal to thereby turn the light continuously off, and causes said third, movable contact to engage said second contact when said actuator is shifted down to thereby switch said electronic circuit in series with the light so that it flashes on and off continuously.

10. A switch apparatus as recited in claim 9 wherein said actuator is translucent, and wherein said switch apparatus further comprises illuminating means mounted within said translucent actuator, said illuminating means being connected across said electronic circuit so that it flashes in opposite duty cycle to the duty cycle of said light.

11. A switch apparatus as recited in claim 9 wherein said asymmetrical cam is comprised of a first pinnacle having a first height, a center surface, a first side surface, said first pinnacle being located between said first side surface and said center surface, a second pinnacle having a second height greater than said first height, and a second side surface, said second pinnacle being located between said center surface and said second side surface, additional effort being required for said cam follower to travel over said second pinnacle than for said cam follower to travel over said first pinnacle.

* * * * *